United States Patent
Cha

(10) Patent No.: US 7,286,181 B2
(45) Date of Patent: Oct. 23, 2007

(54) APPARATUS FOR AUTOMATICALLY ADJUSTING ANGLE OF IMAGE DEVICE FOR INFORMATION PROCESSING EQUIPMENT

(75) Inventor: Soon Chul Cha, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/349,281

(22) Filed: Feb. 8, 2006

(65) Prior Publication Data

US 2006/0128429 A1 Jun. 15, 2006

Related U.S. Application Data

(63) Continuation of application No. 09/974,844, filed on Oct. 12, 2001, now Pat. No. 7,061,536.

(30) Foreign Application Priority Data

Oct. 13, 2000 (KR) ................. 2000-60318

(51) Int. Cl.
*H04N 5/225* (2006.01)
(52) U.S. Cl. ...................... 348/373; 348/374
(58) Field of Classification Search ............. 348/373, 348/374, 375, 376, 207.1, 14.1, 14.01, 14.04
See application file for complete search history.

(56) References Cited

U.S. PATENT DOCUMENTS

| | | | |
|---|---|---|---|
| 4,258,387 A | 3/1981 | Lemelson et al. | |
| 5,111,498 A | 5/1992 | Guichard et al. | |
| 5,396,269 A | 3/1995 | Gotoh et al. | |
| 5,412,417 A | 5/1995 | Tozuka | |
| 5,491,507 A | 2/1996 | Umezawa et al. | |
| 5,550,754 A | 8/1996 | McNelley et al. | |
| 5,768,163 A | 6/1998 | Smith, II | |

(Continued)

FOREIGN PATENT DOCUMENTS

JP 11-95865 4/1997

(Continued)

OTHER PUBLICATIONS

"Camera Tilt Mechanism", IBM Technical Disclosure Bulletin, 39:4:311-314 (Apr. 1, 1996).

*Primary Examiner*—Lin Ye
(74) *Attorney, Agent, or Firm*—Ked & Associates, LLP

(57) ABSTRACT

An apparatus is provided that adjusts an angle of image device used with information processing equipment such as a portable computer, a computer for a Liquid Crystal Display (LCD) monitor, and a Personal Digital Assistance (PDA). As a display device is rotated relative to a main body, a supporting member adjusts a position of the image device according to rotation of the display device to maintain a desired angle of the image device. The information processing equipment can include a main body with a plurality of key buttons and a display body including a display unit which is rotationally coupled to one side of the main body. An image device unit is installed on one side of the display body for holding the image device. A connecting link rotates the image device unit in accordance with the rotation angle of the display body against the main body. Therefore, the angle of image device such as a camera can be automatically controlled according to the movement of the display body.

9 Claims, 12 Drawing Sheets

U.S. PATENT DOCUMENTS

| | | |
|---|---|---|
| 5,801,919 A | 9/1998 | Griencewic |
| 5,948,086 A | 9/1999 | Lin |
| 6,118,653 A | 9/2000 | Kim |
| 6,141,052 A | 10/2000 | Fukumitsu et al. |
| 6,229,569 B1 | 5/2001 | Saito et al. |
| 6,239,841 B1 | 5/2001 | Verstockt et al. |
| 6,323,902 B1 | 11/2001 | Ishikawa |
| 6,587,151 B1 | 7/2003 | Cipolla et al. |
| 6,697,117 B1 | 2/2004 | Park |
| 6,812,958 B1 | 11/2004 | Silvester |
| 6,829,011 B1 | 12/2004 | Higuchi et al. |

FOREIGN PATENT DOCUMENTS

| | | |
|---|---|---|
| JP | 10-301718 | 11/1998 |
| JP | 10301718 | 11/1998 |
| JP | 11095865 | 4/1999 |
| JP | 11-284882 | 10/1999 |

APPARATUS FOR AUTOMATICALLY ADJUSTING ANGLE OF IMAGE DEVICE FOR INFORMATION PROCESSING EQUIPMENT

This application is a Continuation Application of Application Ser. No. 09/974,844 filed Oct. 12, 2001 now U.S. Pat. No. 7,061,536, which claims priority to application Ser. No. 60318/2000 filed in Korea on Oct. 13, 2000, the entirety of which is incorporated herein by reference.

BACKGROUND OF THE INVENTION

1. Field of the Invention

The present invention relates to a portable information processing equipment in which a display device is rotated from a main body or a supporting member such as a portable computer, a computer for a Liquid Crystal Display (LCD) monitor, and a Personal Digital Assistance (PDA), and more particularly, to an apparatus for adjusting angle of an image device such as a camera which is attached to the display device.

2. Background of the Related Art

Generally, information processing equipment is a portable terminal such as a PDA, and a portable computer such as a palmtop computer, a notebook computer, or a laptop computer. Some of these information processing equipments include a display device rotated from a main body or a supporting unit on which various data is displayed. In addition, information processing equipments can include a camera installed on the display device for a video communication.

FIG. 1 is a diagram showing a perspective view of a portable computer that is one of the information processing equipment including a camera. The portable computer includes a main body 11 having a square plate, and a display body 21 rotationally connected to the main body.

A keyboard 13 and a control button 15 are installed on a upper surface of the main body 11, and a plurality of connector ports 17 are installed on a side boundary for connecting with computer external devices. In addition, a pair of hinge coupling units 19 are formed on the main body 11 protruded upward so that the display body 21 can be opened/closed by rotating from/to the main body 11.

A display panel 23, which is electrically connected to a built-in unit in the main body 11 and displays data, is disposed on an inner surface of the display body 21. A camera 31, which is a kind of an image device, is electrically connected to the built-in unit of the main body 11 and rotatably connected to the display body 21 so that the picture/video communication can be made. The camera 31 is installed on an upper end part of the display body 21.

In addition, a camera accepting portion 41 is formed on the upper end part of the display body 21 to position the camera. The camera accepting portion 41 includes a camera connector 45 so that the camera 31 can be electrically connected to the built-in unit in the main body 11. A sliding door 43 is installed on the display body 21 so that the camera accepting portion 41 can be slidingly opened/closed.

The camera 31 includes a camera body 33 connected to the camera connector 45 so as to be removable and a lens unit 35. The lens unit 35 has a lens 34 rotatably connected to the camera body 33 so as to photograph a user for the picture communication.

To make the picture communication using the image device such as the camera in the portable computer described above, the display body 21 is rotated to a certain angle from the main body 11, and then the camera 31 is connected to the camera connector 45 of the display body 21. After that, the lens unit 35 is rotated and controlled so that the camera 31 can photograph the user.

However, the portable computer described above has various disadvantages. The camera connector 45 on which the camera 31 is connected is fixed, and therefore, the angle of the lens unit 35 should be changed whenever the viewing angle of the display body 21 from the main body 21 is changed. Further, since the angle of the display body 21 is changed in order to view displayed information according to posture or height of an user in the conventional portable computer, the user should change the angle of the camera 31 so that a face can be correctly inputted through the camera 31.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide an apparatus for adjusting an angle of an image device for information processing equipment.

Another object of the present invention is to provide an apparatus for adjusting an angle of an image device for information processing equipment to maintain a viewing angle of the image device despite rotational movement of a display body between an open position and a closed position.

Another object of the present invention is to provide an apparatus for adjusting an angle of an image device for information processing equipment by automatically controlling the angle of the image device such as a camera in accordance with movements of a display body.

Another object of the present invention is to provide an apparatus for adjusting an angle of an image device for information processing equipment by automatically controlling the angle of the image device such as a camera to compensate for movements of a display body.

To achieve at least the above objects in a whole or in parts and in accordance with the present invention as broadly embodied and described, there is provided an apparatus for adjusting an angle of an image device for an information processing equipment including a main body including a plurality of key buttons and a built-in unit, a display body having a display unit, rotatably coupled to one side of the main body, an image device unit coupled to the display body that is capable of mounting an image device, and rotation means for rotating the image device unit in accordance with a rotation angle between the display body and the main body.

To further achieve at least the above objects in a whole or in parts and in accordance with the present invention as broadly embodied and described, there is provided an apparatus for automatically adjusting an angle of an image device for an information processing equipment including a main body including a plurality of key buttons and a built-in unit, a display body including a display unit and connected to one side of the main body to rotate between an open position and a closed position, an image device unit installed on one side of the display body and having an image device installed therein, and rotation means having one side connected to the main body spaced apart from a center of rotation of the display body and the other side connected to the image device unit spaced apart from a center of rotation of the image device unit for rotationally connecting the main body to the image device unit.

To further achieve at least the above objects in a whole or in parts and in accordance with the present invention as broadly embodied and described, there is provided an apparatus that adjusts an angle of an image device for an information processing equipment including a display body including a display unit and rotatably coupled to one side of a main body of the information processing equipment, and an image device unit rotating in a prescribed relationship together with the display body.

An apparatus for adjusting the angle of the image device for the information processing equipment according to preferred embodiments of the present invention is constructed so that the photographing and projecting angles are compensated when the display body is rotated from the main body, and therefore the photographing and projecting angles are maintained continuously, and the convenience of the user can be improved.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
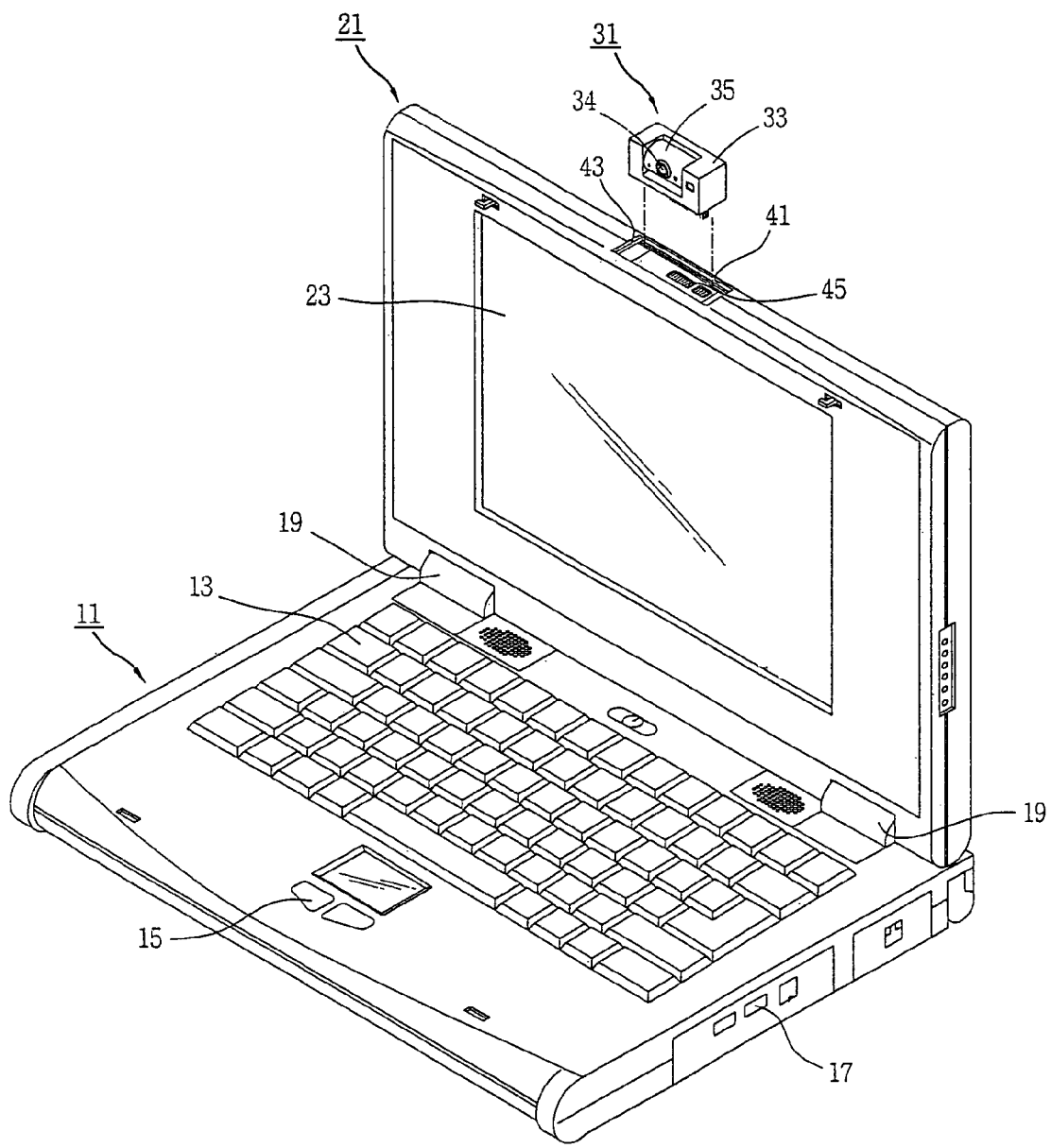
FIG. 1 is a diagram that shows a perspective view of a general portable computer.
Figure 2:
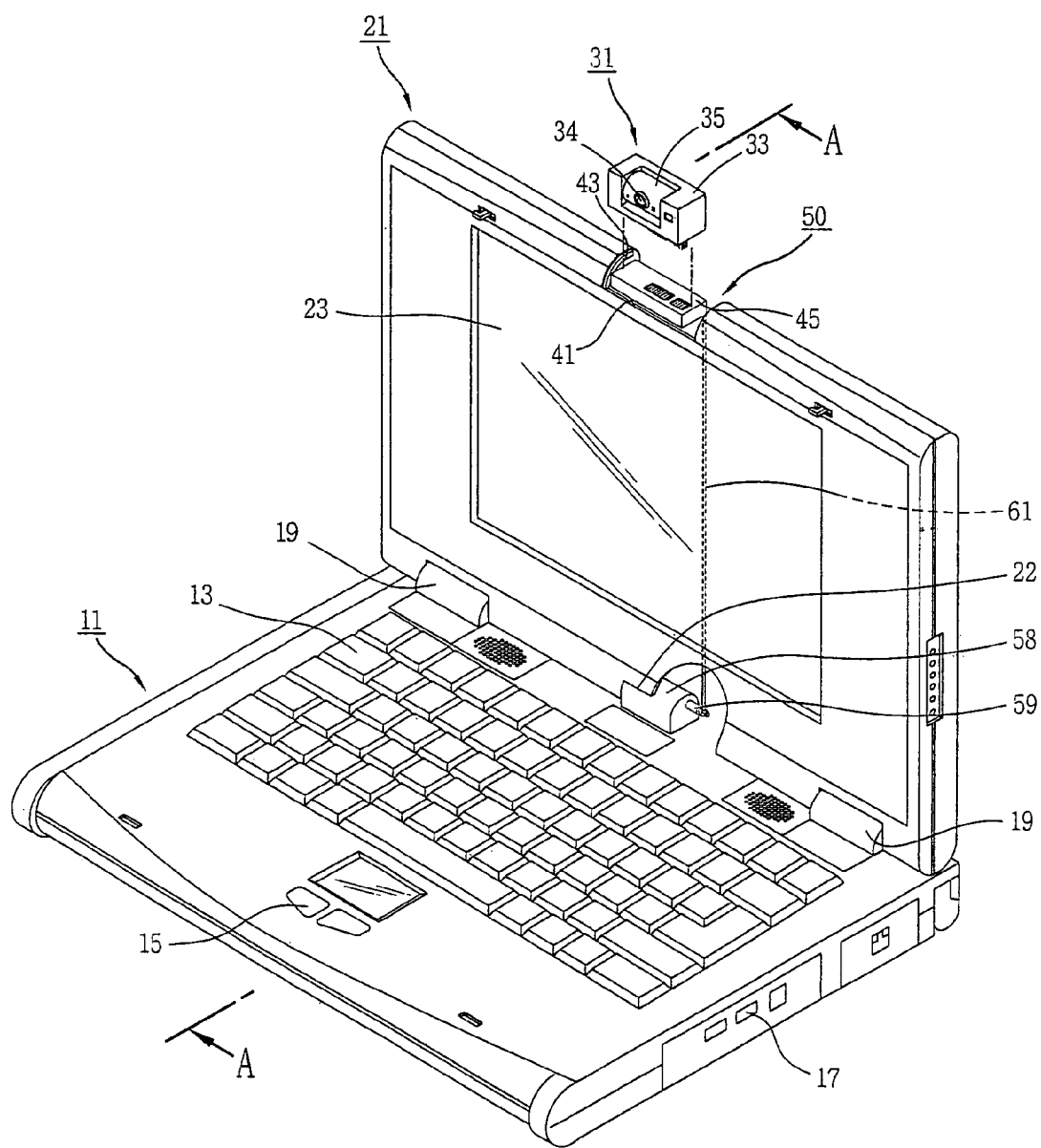
FIG. 2 is a diagram that shows a partially cut perspective view of a first preferred embodiment of an image device adjustment apparatus according to the present invention.
Figure 3:
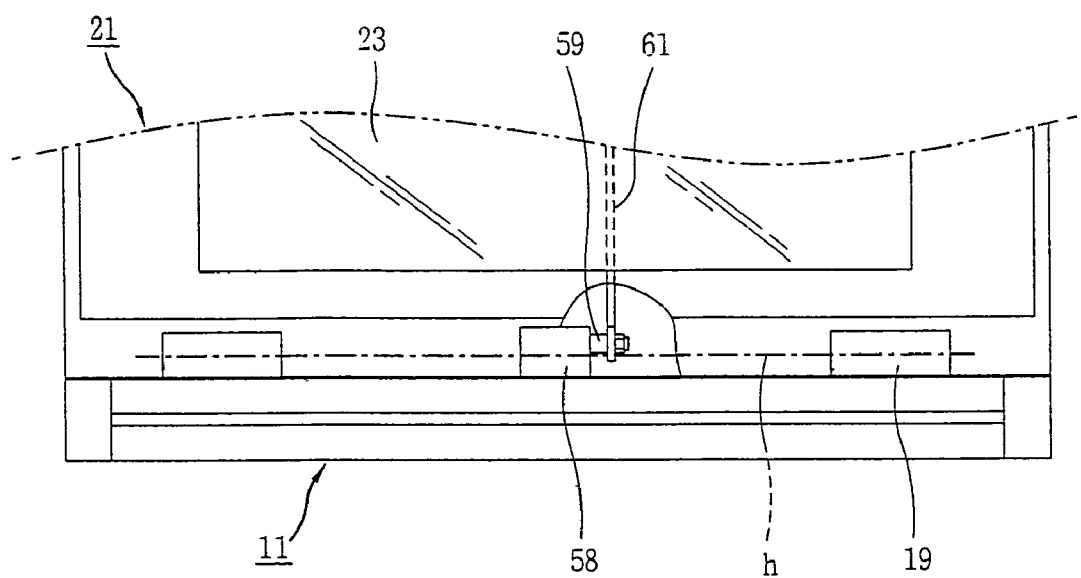
FIG. 3 is a diagram that shows a front view of a portable computer of FIG. 2 according to the first preferred embodiment of the present invention.

FIG. 2 is a diagram that shows a partially cut perspective view illustrating a portable computer including a first preferred embodiment of an apparatus for automatically adjusting an angle of a camera or the like in an information processing equipment according to the present invention. As shown in FIG. 2, the first preferred embodiment of an apparatus for automatically adjusting an angle of a camera is installed in a portable computer. FIG. 3 is a diagram that shows a front view of the portable computer in FIG. 2. Detailed descriptions of the same or similar components as described above in FIG. 1 are omitted here.

The portable computer shown in FIG. 2 according to the preferred embodiments include a main body 11 having a pair of hinge engaging portions 19 on an upper surface, a display body 21 coupled to the hinge engaging portions on the main body 11 so as to be rotational for displaying information, and a camera 31. The camera 31 is preferably removably installed on the display body 21.

The portable computer includes a keyboard 13, a controlling button 15, and a connector port 17. A display panel 23 is preferably disposed on an inner surface of the display body 21 to display the information to a user by being coupled to a built-in unit such as a CPU of the main body 11.

A camera accepting portion 41 having a prescribed shape is formed on an upper center part of the display body 21 so that the camera 31 can be coupled/separated to/from (e.g., removable) the display body 21, and a sliding door 43 is preferably installed next to the camera accepting portion 41 so as to slidingly cover or block the camera accepting portion 41 for protection when the camera 31 is separated from the portable computer. In addition, a camera connector 45 is disposed in the camera accepting portion 41 so that the camera 31 can be electrically coupled to the built-in unit (not shown) of the main body 11. The first preferred embodiment of the apparatus for automatically adjusting the angle of the camera changes the photographing angle of the camera 31 based on the opening or viewing angle of the display body 21.

The first preferred embodiment of an apparatus for automatically adjusting the angle of the camera preferably includes a body protruding portion 58 preferably protruded to the same direction of a protrusion of the hinge engaging portion 19 from a rear center part of the main body 11 and a connecting link 61. The connecting link 61 is preferably coupled between the body protruding portion 58 and a camera installing portion 50 having the camera connector 45 so as to have a link structure inside the display body 21 for changing the angle of the camera 31 according to the rotation angle of the display body 21.

Figure 4:
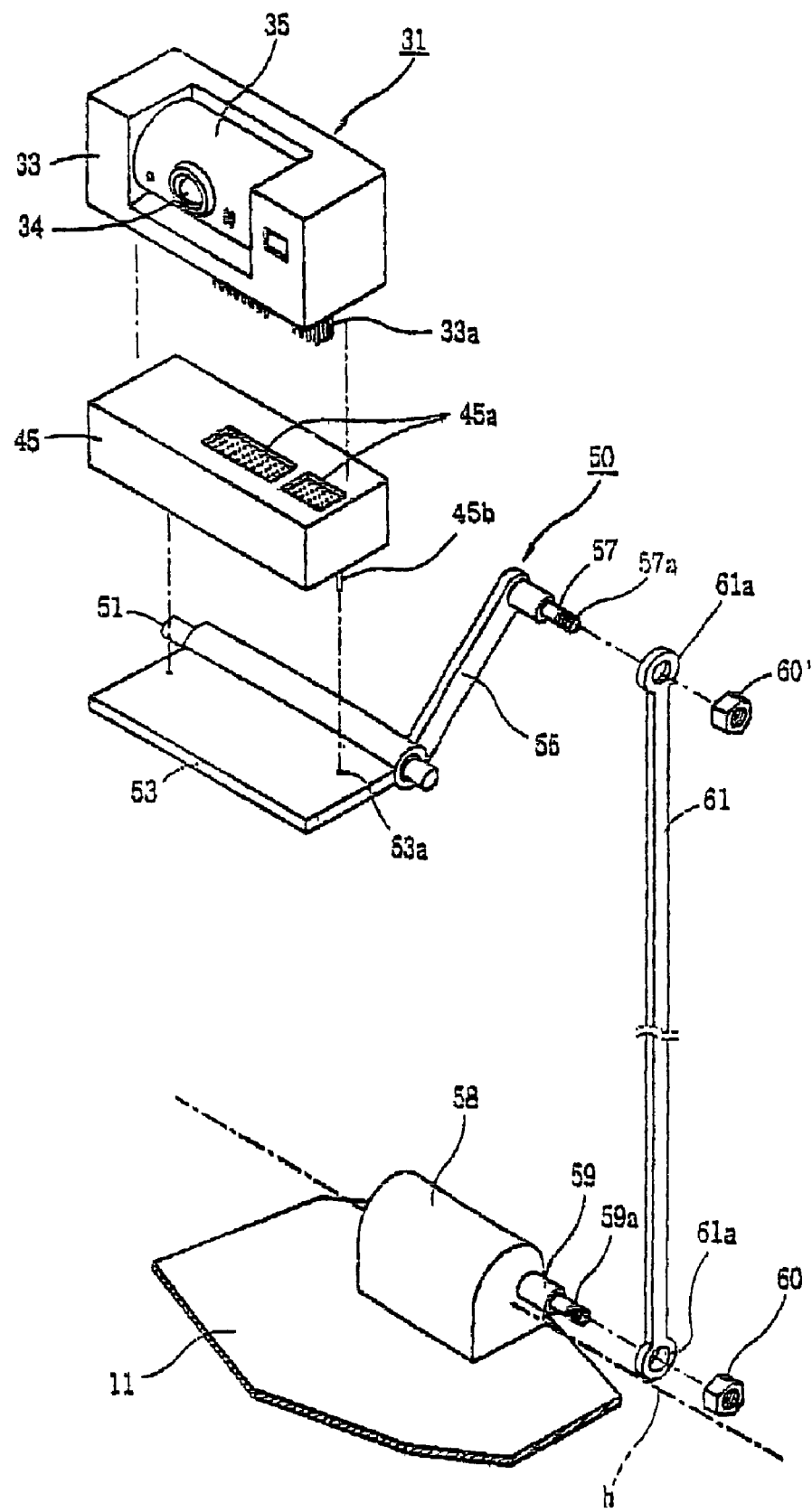
FIG. 4 is a diagram that shows an exploded perspective view of an apparatus for automatically adjusting an angle of an image device according to the first preferred embodiment.

FIG. 4 is a diagram that shows an exploded perspective view illustrating the first preferred embodiment of the apparatus for automatically adjusting the angle of the camera. To change the angle of the camera 31 in accordance with the rotation angle of the display body 21 in the first preferred embodiment, both ends of the connecting link 61 should be coupled a prescribed distance away from rotation centers of the display body 21 and of the camera installing portion 50, respectively. An exemplary operating structure will now be described.

The connecting link 61 can be formed as a long bar, and holes 61*a* are formed on both ends of the connecting link 61 so as to be coupled to the body connecting portion 59 and a link connecting portion 55. In addition, the body connecting portion 59 in which the end of the connecting link 61 is rotatably coupled is installed on the body protruding portion 58 which extends inside the display body 21, but the body connecting portion 59 is offset from the rotation center h of the display body 21.

The body protruding portion 58 is upwardly protruded from the upper surface of the main body 11 to preferably have the same shape of the hinge engaging portions 19 between the pair of hinge engaging portions 19 formed on the main body 11. Thus, the body connecting portion 59 is positioned apart from the rotation center shaft h on the hinge engaging portion 19 preferably in parallel with the center shaft h. A screw unit 59*a* is formed on a end portion of the body connecting portion 59 to engage a nut 60 to prevent the connecting link 61 from escaping. However, the present invention is not intended to be so limited. Other couplings can be used to controllably hold the connecting link 61 in a fixed position relative to the body connecting portion 59.

As shown in FIG. 2, a insertion recess 22 is formed on the display body 21 so that the body protruding portion 58 can be inserted therein. Further, the display body 21 has opened part on the insertion recess 22 corresponding to where the body connecting portion 59 is protruded.

The camera device unit 50 preferably includes a rotation shaft 51 rotatably supported inside the camera accepting portion 41, a supporting plate 53 and the link connecting portion 55. The supporting plate 53 is disposed to be rotational and the camera connector 45 is preferably fixed thereon. The link connecting portion 55 extends toward the opposite direction of the supporting plate 53 and is coupled to the end portion of the connecting link 61 so as to perform a relative motion.

The link connecting portion 55 has a connecting pin 57 protrudingly installed at the position where the connecting link 61 is coupled in parallel with the body connecting portion 59. A screw unit 57*a* is formed on the connecting pin 57 to be coupled to a nut 60' to prevent the connecting link 61 from escaping in a similar method to the body connecting portion 59.

The link connecting portion 55 described above is formed as a single body with the supporting plate 53 and preferably has a rotation centered around the rotation shaft 51 together with the supporting plate 53. The link connecting portion 55 is formed and located to be slanted at a selected angle relative to the supporting plate 53.

The rotation shaft 51 is supported to rotate inside the display body 21, and can be supported, for example, by inserting both end parts into a shaft supporting portion 52 (see FIG. 5) protruded from an inner surface of the display body 21.

A plurality of holes 53*a* are formed on the upper surface of the supporting plate 53 so that the camera connector 45 can be fixed. Fixing pins 45*b* that are coupled to the holes 53*a* protrude from the camera connector 45. Thus, the fixing pins 45*b* of the camera connector 45 are preferably inserted and fixed into the holes 53*a* of the supporting plate 53, whereby the camera connector 45 is moved as a single body with the supporting plate 53. However, the present invention is not intended to be so limited as other couplings can be used to move the camera connector 45 as a single body with the supporting plate. In addition, connecting ports 45*a* or the like in which the connecting pins 33*a* of the camera 31 are inserted are disposed on the camera connector 45.

Figure 5:
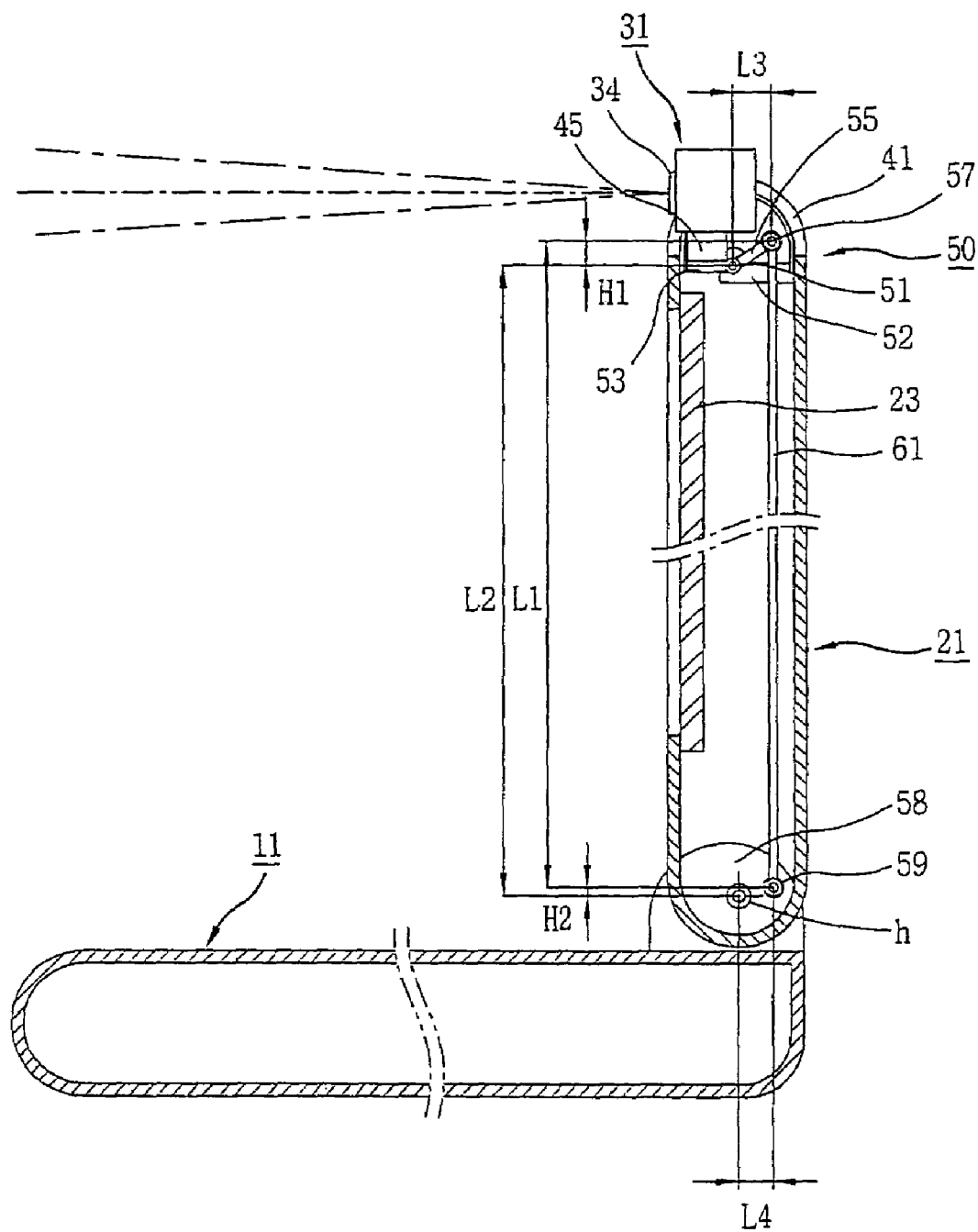
FIG. 5 is a diagram that shows a cross-sectional view along line A-A of the portable computer of FIG. 2 illustrating an operating state of the apparatus for automatically adjusting the angle of the image device where the display body of the portable computer is opened at a right-angle.

FIG. 5 is a diagram that shows a side cross-sectional view illustrating the portable computer of FIG. 2 along line A-A. Exemplary lengths of the connecting link 61 in the first preferred embodiment of the apparatus for automatically adjusting the angle of the camera and positions where the connecting link 61, the connecting pin 57 and the body connecting portion 59 are coupled will now be described with reference to FIG. 5.

In the connecting link 61, a length L1 between the centers of the holes 61*a* is the same as a length L2, which is a shortest distance between the rotation shaft 51 and the rotation center h of the display body 21. As shown in FIG. 5, the body connecting portion 59 is located so that a distance L4 horizontally spaced apart from the rotation center h of display body is the same as a distance L3 between the rotation shaft 51 and the connecting pin 57. Further, the body connecting portion 59 is disposed to have a prescribed height difference H2 from the rotation center h of the display body 21 that corresponds a height difference H1 of the connecting pin 57 from the rotation shaft 51. However, the present invention is not intended to be so limited.

Figure 6:
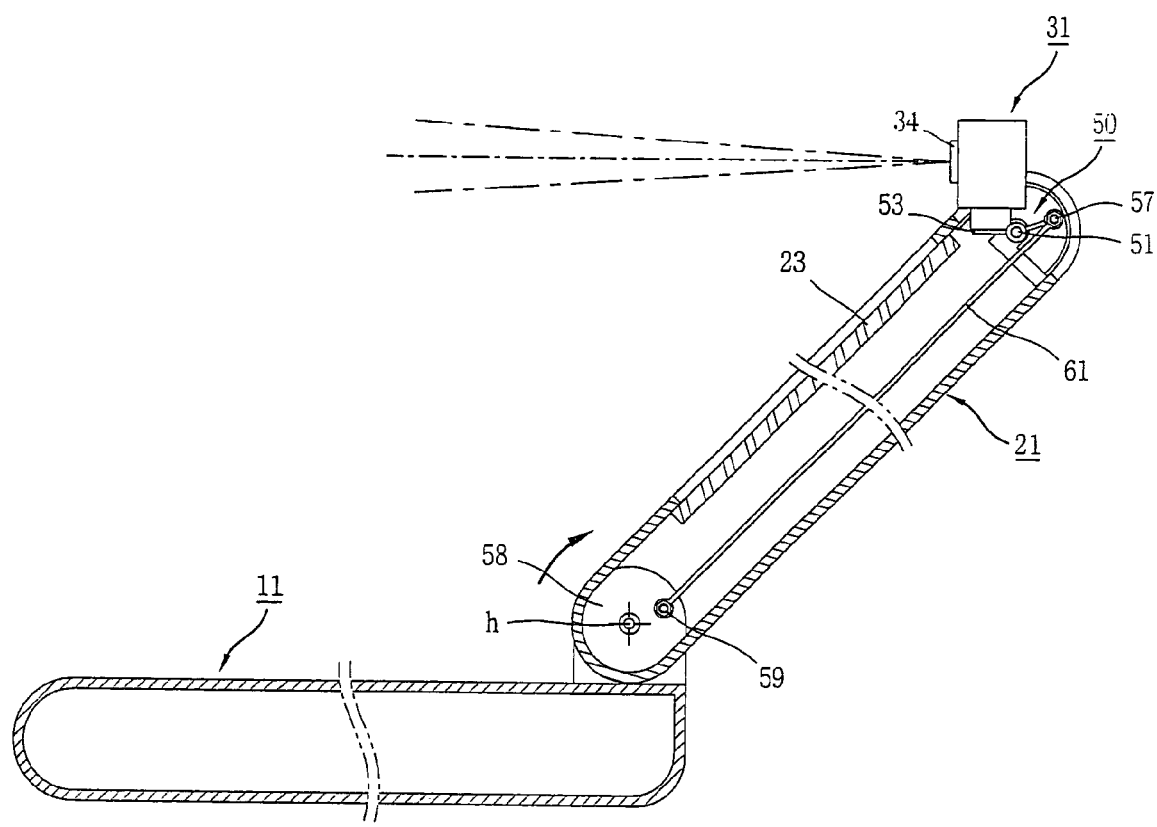
FIG. 6 is a diagram that shows a cross-sectional view along line A-A of the portable computer of FIG. 2 illustrating is an operating state when the display body of the portable computer is opened at an obtuse angle.
Figure 7:
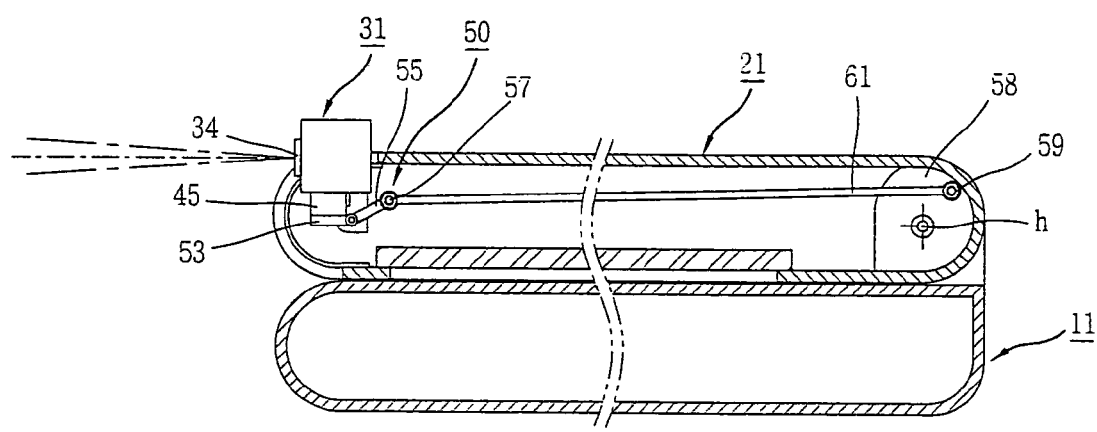
FIG. 7 is a diagram that shows a cross-sectional view along line A-A of the portable computer of FIG. 2 illustrating an operating state when the display body of the portable computer is closed.

Operations of the portable computer having the first preferred embodiment of the apparatus for automatically adjusting the angle of camera according to the present invention will now be described with reference to FIGS. 5, 6, and 7. FIG. 5 is a view showing an operating state of the first preferred embodiment of the apparatus for automatically adjusting the angle of the camera in the state that the display body of the portable computer is opened at a right-angle. FIGS. 6 and 7 are views showing an operating state of the apparatus when the display body of the portable computer is opened at an obtuse angle and closed, respectively.

For video communications using the camera 31, the display body 21 is moved to stand from the main body 11, for example as shown in FIG. 5, and then the sliding door 43 coupled to the display body 21 is opened to open the camera accepting portion 41. The camera 31 is then coupled to the camera connector 45 disposed inside the camera accepting portion 41, and the angle of the camera 31 is controlled so that the lens unit 35 of the camera 31 is directed to a user by rotating the lens unit 35 against the camera body 33.

When the user rotates the display body 21 to the clock-wise direction behind the main body 11 in order to control the tilt angle of the display panel 23, for example to yield an obtuse angle as shown in FIG. 6, the supporting plate 53 moves to the counter clock-wise direction centered on the rotation shaft 51 relative to the angle or amount of movement of the display body 21, which is centered on the rotation center h, because of the connecting link 61 coupled to the link connecting portion 55. Thus, the rotation angle or amount of the display body 21 is compensated and the earlier preset photographing angle of the lens unit 35 is preferably maintained.

When the user rotates the display body 21 to the counter clock-wise direction in the state that the camera 31 is not separated from the camera connector 45, the supporting plate 53 is rotated to the clock-wise direction relative the display body 21, for example as shown in FIG. 7. When the portable computer is closed, the camera 31 is rotated behind the upper end part of the display body 21 and the lens unit 35 is faced frontward as shown in FIG. 7.

Therefore, in the first preferred embodiment of the apparatus for automatically adjusting the angle of the camera according to the present invention, when the display body 21 is moved from the main body 11 between an open position and a closed position, then the camera 31 is correspondingly rotated to an opposite direction of the rotation angle of the display body 21. Therefore, the photographing angle can be compensated, and problems or inconveniences of controlling the photographing angle of the camera can be reduced or solved.

Figure 8:
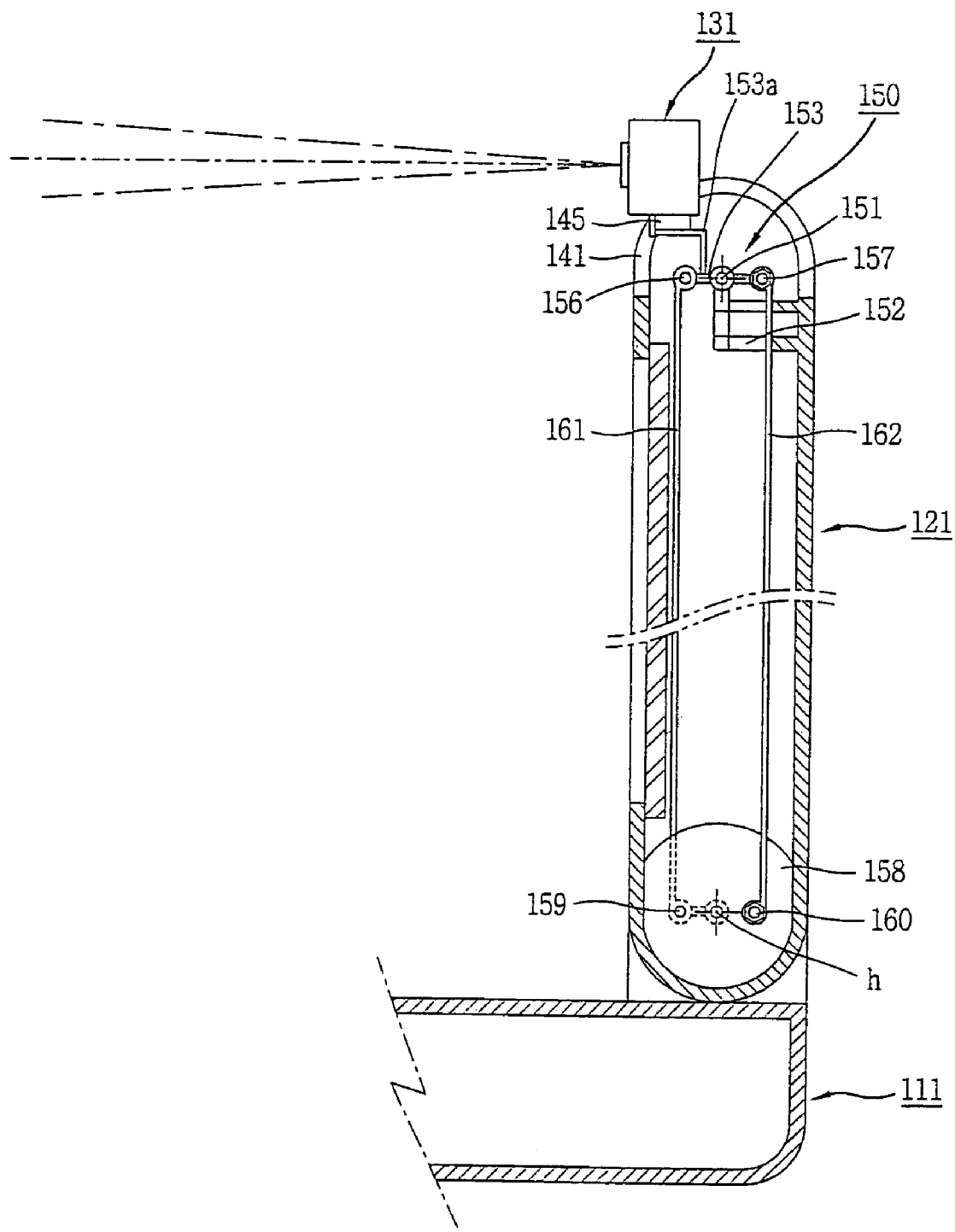
FIG. 8 is a diagram that shows a side cross-sectional view of a second preferred embodiment of an apparatus for automatically adjusting angle of a camera according to the present invention illustrating an operating state when a display body of a portable computer is vertically opened.
Figure 9:
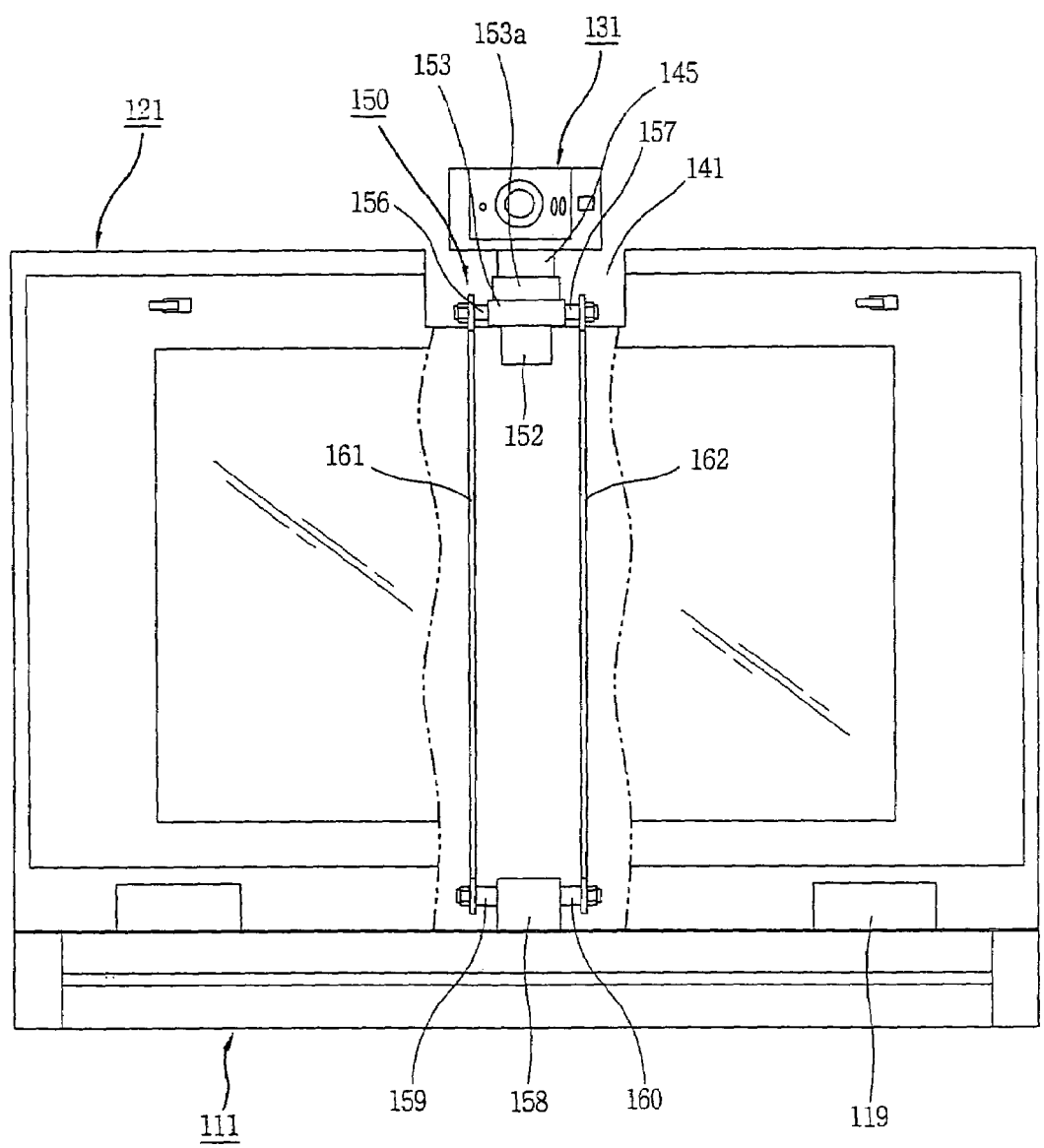
FIG. 9 is a diagram that shows an elevational view in section of the portable computer of FIG. 8 according to the second preferred embodiment of the present invention.

FIG. 8 is a diagram that shows a side cross-sectional view of an apparatus for automatically adjusting an angle of an image device according to a second preferred embodiment of the present invention mounted in a display body of a portable computer opened vertically. FIG. 9 is a diagram that shows an elevational front view having a cut-away section showing principal parts in the portable computer according to the second preferred embodiment of the present invention.

In the second preferred embodiment of a portable computer according to the present invention, a first connecting link 161 and a second connecting link 162 are respectively installed between a camera device unit 130 and a main body 111 preferably on front and rear sides of the display body 121 to automatically control a photographing angle of a camera 131. However, the present invention is not intended to be so limited. For example, fewer or more multiple connecting links could be installed on the same side of the display body.

As shown in FIGS. 8-9, the second preferred embodiment of the apparatus for automatically adjusting an angle of a camera couples the first connecting link 161 from a left side of a body protruding portion 158 protruded from the main body 111 on an inner front side of the display body 121. The second connecting link 162 couples from a right side of the body protruding portion 158 protruded from the main body 111 on an inner rear side of the display body 121.

One advantage of positions of the first and second connecting links 161 and 162 being set differently is preventing interference between the first and the second connecting links 161 and 162 when the display body 121 is totally opened/closed relative to the main body 111.

A first and a second body connecting portions 159 and 160 in which the first and second connecting links 161 and 162 are coupled are formed respectively on both sides of the body protruding portion 158. The first and second body connecting portions 159 and 160 are preferably disposed on opposing sides of the rotation center h of the display body 121.

A camera device unit 150 is preferably installed to an inner upper side of the display body 121. However, the present invention is not intended to be so limited. The camera device unit 150 includes a rotation shaft 151 preferably supported inside the display body 121, a supporting plate 153 supported by the rotation shaft 151, and connecting portions 156 and 157 preferably protruded on both sides of the supporting plate 153 so that the first and the second connecting links 161 and 162 are rotationally coupled therein or thereto. The rotation shaft 151 is rotationally supported on a shaft supporting unit 152 or the like fixed inside the display body 121.

The supporting plate 153 rotates around the rotation center 151 and has the rotation center 151 preferably on center portion. A connector supporting portion 153a is preferably upwardly protruded on an upper portion of the supporting plate 153 so that the camera 131 is installed on a camera connector 145. However, the camera connector 145 may be directly fixed on the upper surface of the supporting plate 153 as in the first preferred embodiment according to the present invention without forming the connector supporting portion 153a.

The connecting portions 156 and 157 are located on the front and the rear sides of the display body 121 as shown in FIG. 8 and the first and the second connecting links 161 and 162 are respectively coupled thereto. The connecting links 161 and 162 can be made using metal wires having a certain diameter with a circular ring portion on both end parts to be respectively assembled to the body connecting portions 159 and 160 and to the connecting portions 156 and 157.

In the second preferred embodiment of the apparatus for automatically adjusting the angle of the camera according to the present invention, the photographing angle of camera 131 is compensated by moving of the connecting links 161 and 162 and the supporting plate 153 as a parallelogram structure according to the movement of the display body 121 as shown in FIG. 8. However, the present invention is not intended to be so limited.

Figure 10:
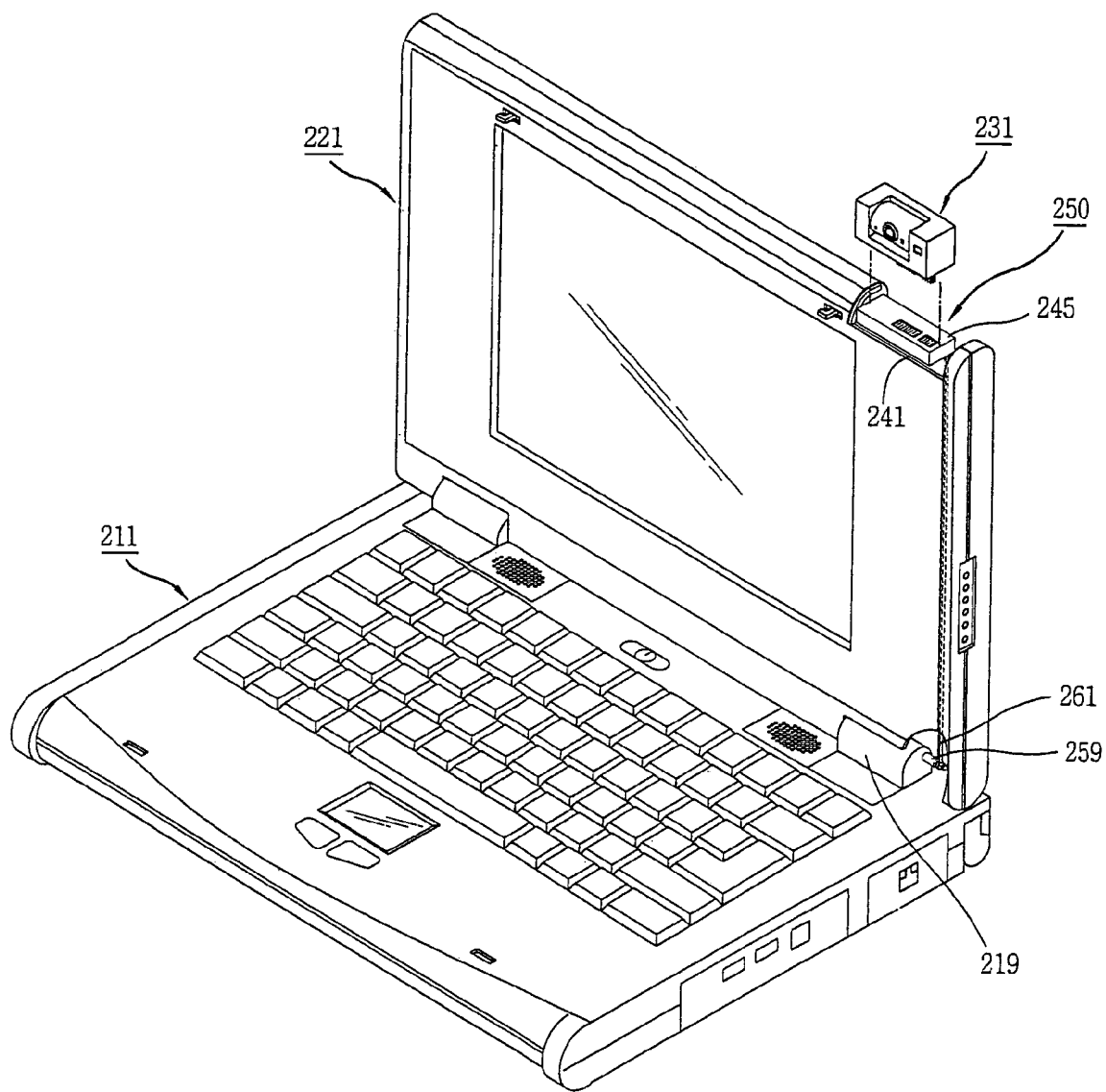
FIG. 10 is a diagram that shows a partially cut perspective view of an apparatus for automatically adjusting angle of a camera according to a third preferred embodiment of the present invention.

FIG. 10 is a diagram that shows a partial cut perspective view showing a third preferred embodiment of a apparatus for automatically adjusting an angle of a camera according to the present invention. The third preferred embodiment of the apparatus for automatically adjusting an angle of a camera is mounted in a portable computer.

A camera accepting portion and a camera device unit are located on the center part of a display body in the first and second preferred embodiments. However, a camera accepting portion 241 and a camera device unit 250 are located on a right upper end of a display body 221 and a connecting link 261 is installed to an inner right side of the display body 221 in the third preferred embodiment as shown in FIG. 10.

In the third preferred embodiment of the apparatus for automatically adjusting an angle of a camera, a body connecting portion 259 is protruded from a side surface of a right hinge engaging portion 219 on a main body 211. The connecting link 261 preferably extends upwardly from the body connecting portion 259 to the camera device unit 250 to compensate an angle of the camera 231 according to the movement of the display body 221 between an open and closed position.

As shown in FIG. 10, structures of the camera connector 245, a supporting plate (not shown), a rotation shaft (not shown), and a link connecting portion (not shown) forming the camera device unit 250 are preferably similar to the first preferred embodiment according to the present invention and a detailed description is omitted. The camera device unit 250 and the connecting link 261 are installed on the right side in the third preferred embodiment of the apparatus for automatically adjusting an angle of a camera, however, these may be installed on left side of the display body 221 according to the conditions. Further, the connecting link 261 is coupled to a right lateral side of the hinge engaging portion 219, but could be installed on a left inside lateral side or both sides of the hinge engaging portion 219.

Figure 11:
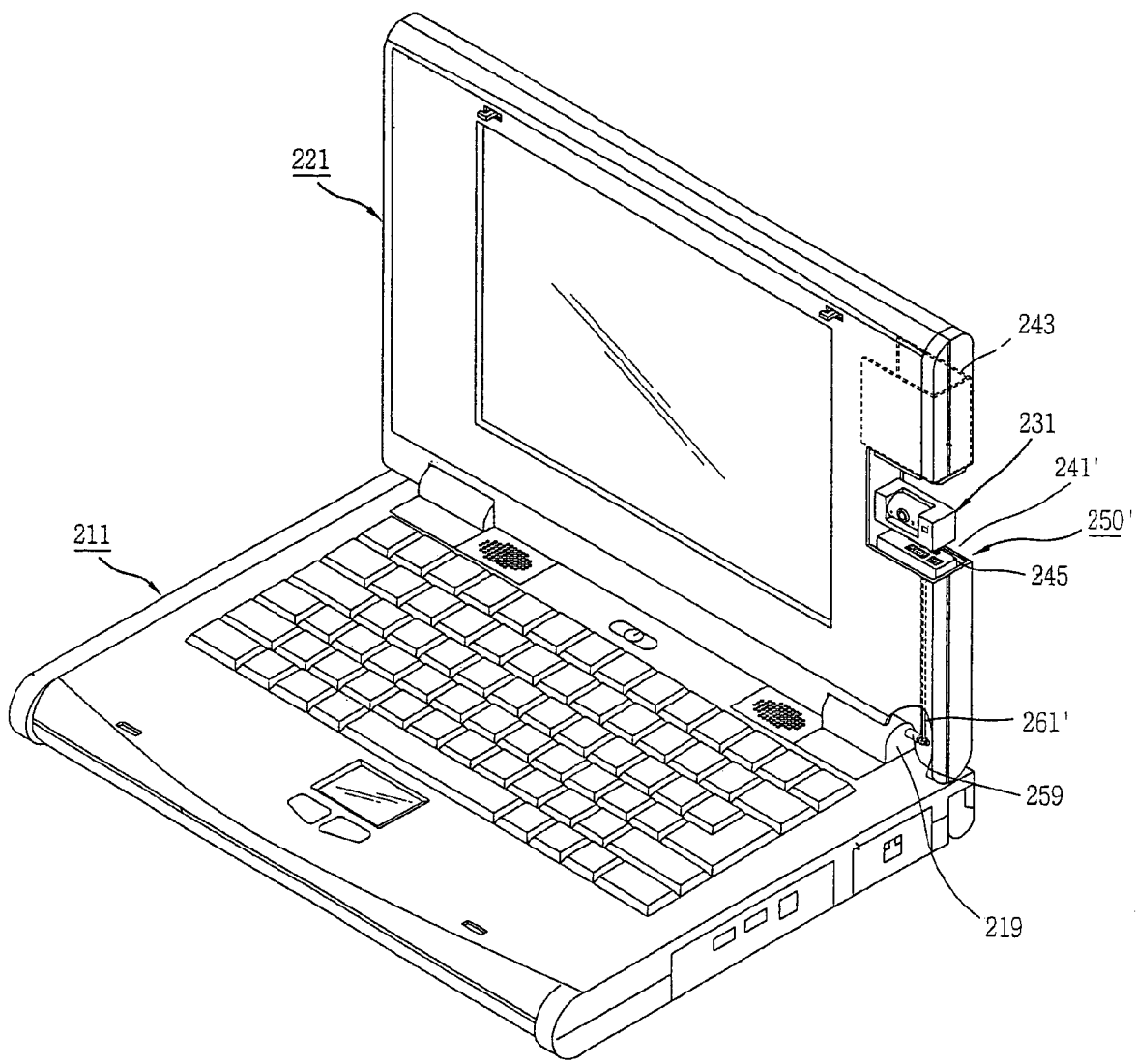
FIG. 11 is a diagram that shows a partially cut perspective view of an apparatus for automatically adjusting angle of a camera according to a fourth preferred embodiment of the present invention.

FIG. 11 is a diagram that shows a partially cut perspective view showing a fourth preferred embodiment of apparatus for automatically adjusting an angle of a camera according to the present invention. The fourth preferred embodiment of the apparatus for automatically adjusting an angle of a camera is mounted in a portable computer.

In the portable computer of FIG. 11, a camera accepting portion 241' and the camera device unit 250' are located on a right central part of the display body 221, and a connecting link 261' is coupled to the right hinge engaging portion 219 of the main body 211 from the camera device unit 250'. That is, the camera accepting portion 241' is preferably formed by omitting a center part on a side surface of the display body 221 so that the camera is located therein. Preferably, the camera connector 245, a supporting plate, a rotation shaft, and a connecting portion for constituting the camera device unit 250' are installed in the camera accepting portion 241'. A sliding door 243 for protecting the camera device unit 250' can be retractably disposed in the display body 221.

In the fourth preferred embodiment of the apparatus for automatically adjusting an angle of a camera, a body connecting portion 259 is protruded from a side surface of a right hinge engaging portion 219 on a main body 211. The connecting link 261' preferably extends upwardly from the body connecting portion 259 to the camera device unit 250' to compensate an angle of the camera 231 according to the movement of the display body 221. In addition, the connecting link 261' is connected to a body connecting portion 259 apart a certain distance from a rotation center of the display body 221 on the hinge engaging portion 219 of the main body 211 similar to the third preferred embodiment.

Figure 12:
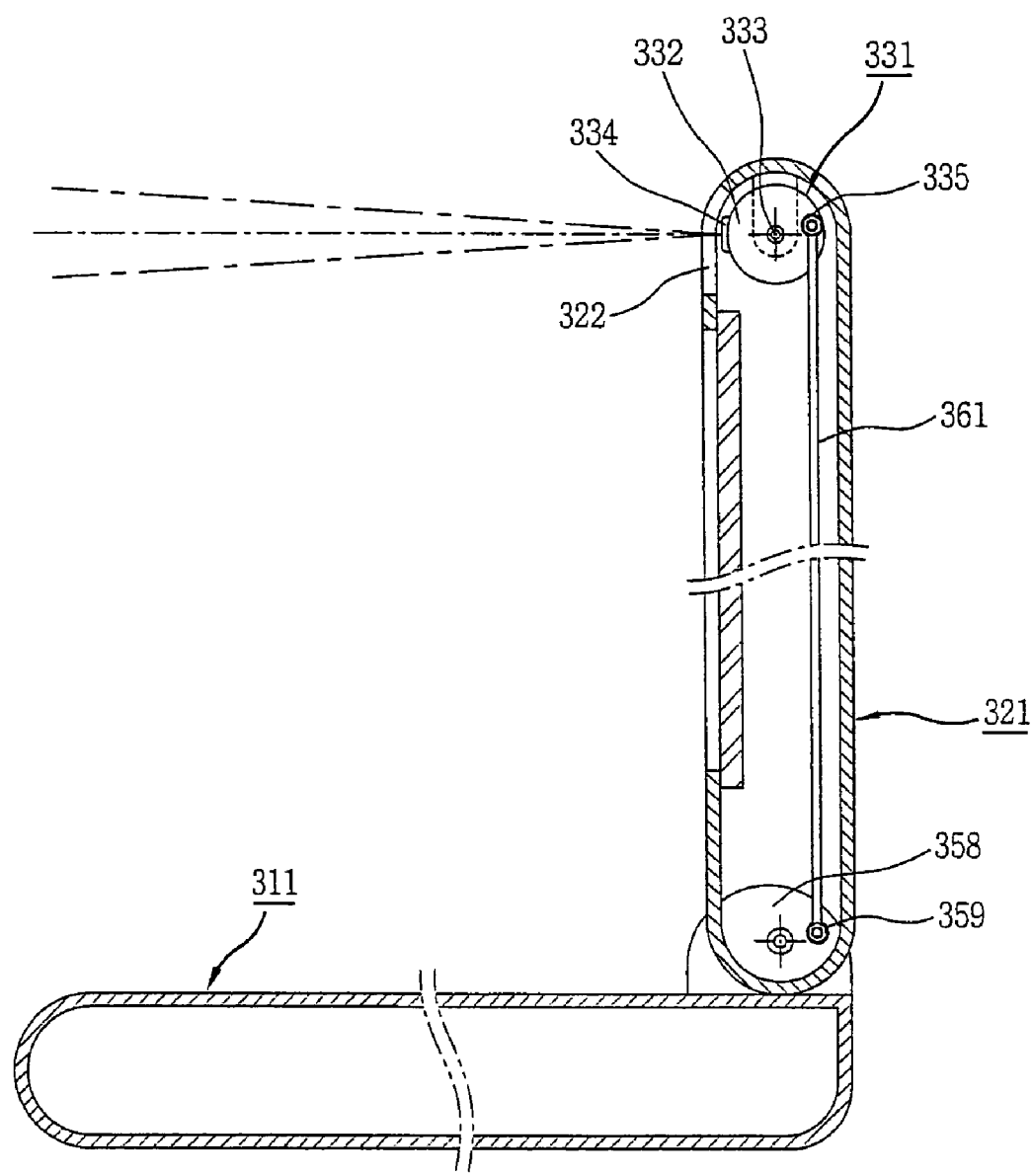
FIG. 12 is a diagram that shows a side cross-sectional view of an apparatus for automatically adjusting angle of a camera according to a fifth preferred embodiment of the present invention.

FIG. 12 is a diagram that shows a side cross sectional view of a fifth preferred embodiment of a apparatus for automatically adjusting an angle of a camera according to the present invention. The fifth preferred embodiment is mounted in a portable computer having a display body 321 and a main body 311.

A camera connector is formed so that the camera can be inserted/separated to/from the display body in the first through fourth preferred embodiments, however, a camera 331 in the fifth preferred embodiment is coupled to a connecting link 361 by being rotationally installed inside the display body 321.

As shown in FIG. 12, a camera body 332 is supported inside the display body 321 capable of rotation, and a connecting portion 335 is spaced apart by a prescribed distance (e.g., offset) from a rotation shaft 333 of the camera body 332. The connecting link 361 is coupled to the connecting portion 335. In addition, the connecting link 361 is coupled to a body connecting portion 359 protruded from a body protruding portion 358 of the main body 311, for example, as in the first preferred embodiment.

An opened portion 322 is formed on a front surface of the display body 321 so that a lens unit 334 of the camera 331 is exposed. The camera 335 may be formed as a circle so as to smoothly rotate in the display body 321 as shown in FIG. 12. However, the present invention is not intended to be so limited. Further, the camera 331 may be coupled to the connecting link 361 by installing an additional supporting plate (not shown) on one or both sides of the camera 331 as described above.

As described above, the preferred embodiments according to the present invention were described using exemplary devices including a camera and a portable computer. However, the present invention is not intended to be so limited. For example, instead of a camera, which is detachably installed on the portable computer in the above preferred embodiments other image devices such as a projector can be installed on the portable computer. Also, the preferred embodiments of present invention can be applied to general monitors including an Liquid Crystal Display (LCD) monitor. Such an LCD monitor corresponds to the display body in the preferred embodiments, and a pedestal for supporting the LCD monitor corresponds to the main body.

As described above, preferred embodiments of an apparatus for automatically adjusting an angle of an imaging device such as a camera according to the present invention have various advantages. According to preferred embodiments of the present invention, both ends of a connecting link are rigidly connected together, each end spaced apart from the rotation centers of a camera device unit and a display body for an information processing device at a prescribed angle and distance. A rate of a changed angle of an installed camera is modified by the connecting link in accordance with the changed angle of the display body and can be controlled by controlling the angle and distance between the connecting link and the rotation centers according to the preferred embodiments. For example, it may be set such that the rotation angle of the installed camera is changed as 9.5° when the rotation angle of the display body is changed as 10°. Further, preferred embodiments of an apparatus for automatically adjusting the angle of an image device according to the present invention are constructed so that the photographing and projecting angles of the image device unit such as a camera can be compensated when the display body is rotated relative to a main body of an information processing device, and therefore, the viewing, photographing or projecting angles that are set earlier can be maintained despite relative movement of the display body. In addition, the convenience of the information processing device can be increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for adjusting an angle of image unit for information processing equipment, the apparatus comprising:
   a rotatable supporting part configured to maintain a position of an imaging device relative to a main body of the information processing equipment; and
   a rotation device configured to rotate the imaging device in accordance with a rotation angle of the main body, wherein the rotation device comprises a connecting link configured to connect the main body to the imaging device, wherein a first end of the connecting link is configured to be connected to a side of the main body data position which is spaced apart a certain distance from a center of rotation of the supporting part, and a second end of the connecting link is configured to be connected to the imaging device data position which is spaced apart a certain distance from a center of rotation of the imaging device, wherein the rotatable supporting part comprises:
   a rotation shaft rotatably supported by the main body;
   a supporting plate which extends to both sides of the rotation shaft, wherein the supporting plate is configured to receive the imaging device on an upper surface thereof; and
   link connecting portions which extend from front and rear sides of the supporting plate direction substantially parallel to the rotation shaft, wherein each of the link connecting portions are configured to be connected to the rotation device.

2. The apparatus of claim 1, wherein the imaging device is positioned at one of an upper central part of the main body, on a left edge on an upper end of the main body, on a right edge on the upper end of the main body, or on side portions of the main body, and wherein a sliding door is included in the main body so as to open/close the imaging device in the main body.

3. The apparatus of claim 1, wherein the imaging device comprises a camera, a projector, or a monitor.

4. Information processing equipment comprising the apparatus of claim 1.

5. The apparatus of claim 1, wherein the link connecting portions comprise a first connecting portion which extends from a front portion of a first side of the supporting plate, and a second connecting portion which extends from a rear portion of a second side of the supporting plate opposite the first side.

6. The apparatus of claim 5, wherein the connecting link comprises a first link which extends between the first connection portion and the main body, and a second link which extends between the second connecting portion and the main body.

7. The apparatus of claim 6, wherein the corresponding first ends of the first and second links are each offset an equal but opposite distance from the rotation shaft, and corresponding second ends of the first and second links are each offset an equal but opposite distance from a center of rotation of the main body.

8. An apparatus for adjusting an angle of image unit for information processing equipment, the apparatus comprising:

a rotatable supporting part configured to maintain a position of an imaging device relative to a main body of the information processing equipment; and a rotation device configured to rotate the imaging device in accordance with a rotation angle of the main body, wherein the rotation device comprises a connecting link configured to connect the main body to the imaging device, wherein a first end of the connecting link is configured to be connected to a side of the main body at a position which is spaced apart a certain distance from a center of rotation of the supporting part, and a second end of the connecting link is configured to be connected to the imaging device at a position which is spaced apart a certain distance from a center of rotation of the imaging device, wherein the rotatable supporting part comprises:

a supporting plate configured to receive the imaging device thereon;

a rotation shaft configured to rotatably support the supporting plate; and a link connecting portion which protrudes from the supporting plate and which is configured to be coupled to the connecting link, wherein the link connecting portion extends from the rotation shaft at a prescribed angle relative to the supporting plate.

9. The apparatus of claim 8, further comprising an imaging device connector provided on an upper surface of the supporting plate and configured to electrically couple the imaging device and the information processing equipment.

* * * * *